July 13, 1926. 1,592,781

H. RENKHOFF

TILTABLE SLIDING SADDLE FOR BICYCLES

Filed June 21, 1924

Patented July 13, 1926.

1,592,781

UNITED STATES PATENT OFFICE.

HEINRICH RENKHOFF, OF DUISBURG-RUHRORT, GERMANY, ASSIGNOR TO BUCHLOH & RENKHOFF, G. M. B. H., OF DUISBURG-RUHRORT, GERMANY.

TILTABLE SLIDING SADDLE FOR BICYCLES.

Application filed June 21, 1924, Serial No. 721,554, and in Germany January 18, 1924.

The cyclist exerts when using the bicycle by the muscles of his legs, assisted by a variable part of the weight of his body and by the pressure exerted by the hands on the handle bar, a loading of the rotating pedals which makes itself felt at the propulsion of the bicycle.

At the transition from running at slow speed to a higher speed the pressure effect acting on the saddle surface increases as the cyclist attempts to push the pressure surfaces and the points of support away from one another and to stretch the legs in order to be able to submit them to greater stress. In bicycles with stationary saddles not only the pedals and the handle bar but also the saddle which is generally badly adjusted with regard to the length of the legs oppose resistance to this increased pressure action wherefrom results that the bodily exertion is utilized only partly and a rapid fatiguing of the body which is favoured further by the fact that the rigid saddle arrangement cannot yield to the movements of the body neither in the longitudinal nor in the lateral directions.

It has been repeatedly proposed to avoid these inconveniences and several arrangements have become known according to which the saddle is constructed as a sliding saddle. The saddle frame or the seat is fixed on a spring controlled frame shiftable in longitudinal direction or on a slidable rod. Saddles have further become known which permit also of a movement of the bicycle in lateral direction. All these arrangements present however numerous inconveniences and these forms of construction in which, besides the shifting of the saddle in the longitudinal direction a lateral displacement is possible, present especially the inconvenience that the saddle hangs over to the one or other side of the bicycle so that the cyclist is rather made uneasy instead of being assisted in his exertions.

These inconveniences are avoided according to the present invention in favouring the automatic adjusting of the saddle by giving to the point at which the saddle is attached to the saddle frame the lowest possible position preferably below the supporting sleeve of the saddle. Springs or air pressure or hydraulic means are further used for returning the saddle to the initial position whereby the cyclist is assisted at higher stress on the pedals.

The invention will be best understood from the following description in connection with the accompanying drawing, in which:—

The sliding saddle tiltable in lateral direction consists of the usual leather seat $a$ which is mounted by means of two lateral wire bows $b$ in the projecting extensions $c$ of the slide frame $d$ made of two parts. The saddle is adjustable in this frame and adapted to be secured in position by the clamping plates $e$ with the aid of screws $f$. The slide frame $d$ made from steel tube bent in S-shape has at the middle on each side a rectangular boss $g$ which is designed to receive the screws $f$. The slide frame $d$ composed of two parts is fixed by nuts $h$, $i$ at the two ends and supported by a tubular slide rod $k$ bent at the rear end. The slide rod $k$, which may be of solid cross section, traverses a casing $m$ and carries on the front end a sleeve $n$ with inner flanged end, bearing against a spiral spring $o$ wound around rod $k$. The cylindrical casing $m$ is closed at one end by a closing sleeve $p$ and slit clamping nut $q$ and at the other end by a sleeve $r$ and it is fixed on the saddle pin $s$ which is clamped on the bicycle frame $t$.

Figure 1:
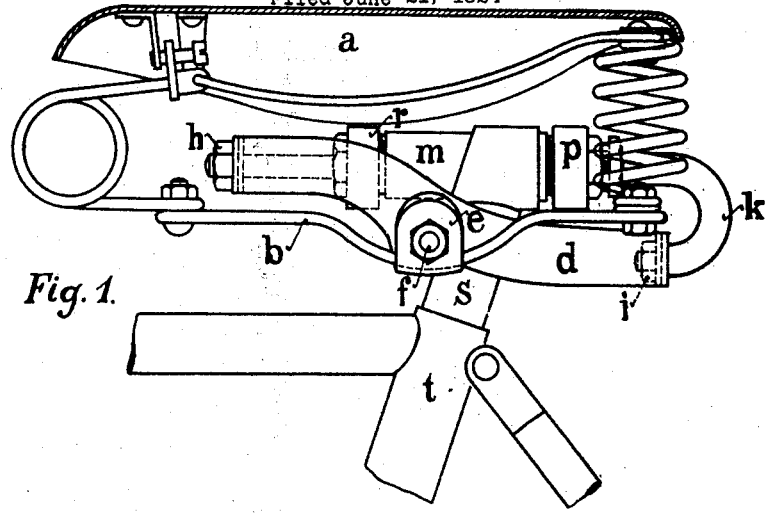
Fig. 1 shows an improved tiltable sliding saddle in side elevation.
Figure 2:
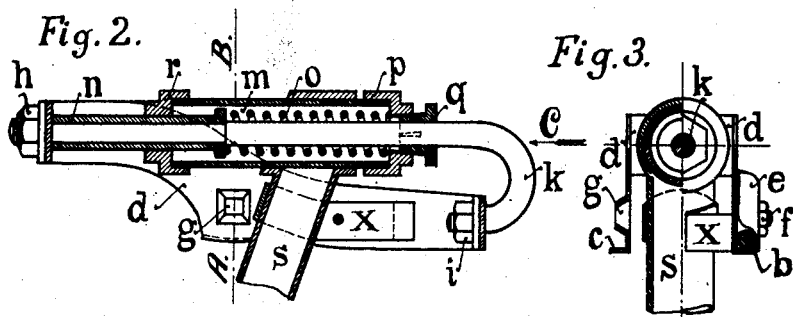
Fig. 2 is a longitudinal section through the slide frame.
Figure 3:
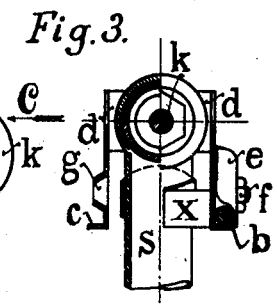
Fig. 3 shows in the left half a section on line A—B of Fig. 2 and at the right half an elevation viewed in the direction of the arrow C.
Figure 4:
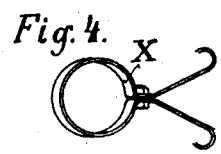
Fig. 4 shows the two-armed blade spring.
Figure 5:
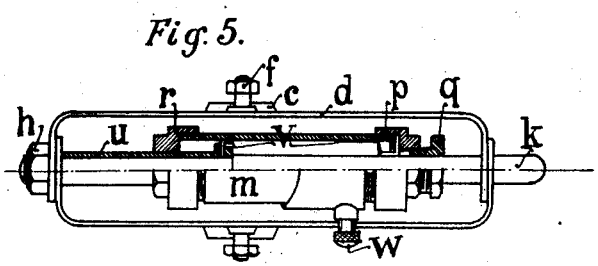
Fig. 5 shows in plan view the upper half in section, of a form of construction of the slide frame when compressed air is used.

When instead of spring $o$ pneumatic or hydraulic pressure is used the following construction, as shown in Fig. 5 is used. On the slide rod $k$ a piston $u$ and two leather packing rings $v$ are provided. A safety valve $w$ is arranged in the cylindrical casing $m$. The spring $o$ is omitted.

In both forms of construction a blade spring $x$ clamped on the saddle pin $s$ serves to limit the tilting movement of the saddle and to return the slide frame to the normal position.

The sleeves $p$ and $r$ are loosely mounted on the casing *m* so as to permit the tilting movement of the saddle.

The operation is as follows:—

By the increased pressure exerted on the saddle the slide rod *k* of this saddle slides in rearward direction, said slide rod being connected with the saddle frame by the slide frame *d* so that the distance between the saddle and the pedals is increased in accordance with the increase of pressure. When the load decreases, the bicycle running at slower speed, the saddle will be partly or entirely returned to the initial position by the action of the spiral spring *o* or by the action of the pneumatic or hydraulic pressure.

Owing to the pivotable mounting of the slide rod *k* in the supporting sleeve the saddle tilts in accordance with the movements of the body of the cyclist, the frame *d* pressing on the corresponding arm of the blade spring *x*. The arms of this blade spring slip on the slidable frame *d* when the same is being shifted in longitudinal direction. The blade springs tend to return the saddle to the horizontal position.

I claim:—

A tiltable sliding seat for bicycles, comprising in combination a leather saddle, a saddle frame on which said saddle is fixed, an S-shaped frame composed of two parts adjustably fixed on the lower part of said saddle frame, a saddle pin on the bicycle frame, a horizontal tube fixed on said saddle pin so that it is situated in the space between the upper and lower parts of said saddle frame, a rod slidably mounted in said horizontal tube and having its rear end bent downward to engage with the rear end of said S-shaped frame, a sleeve on the front end of said rod, a flanged end of said sleeve, means for elastically maintaining said slide rod in the normal position in said tubular support, and a two-armed blade spring fixed on said saddle pin so that its two arms bear each on one side of said S-shaped frame to maintain the same and with it the saddle in the horizontal position.

In testimony whereof I affix my signature.

HEINRICH RENKHOFF.